United States Patent
Haudrechy

(10) Patent No.: US 11,613,382 B2
(45) Date of Patent: Mar. 28, 2023

(54) METHOD FOR INTEGRATING EQUIPMENT IN A TECHNICAL BAY OF AN AIRCRAFT USING AN INTEGRATION MODULE, AND AIRCRAFT COMPRISING AT LEAST ONE INTEGRATION MODULE

(71) Applicant: Airbus Operations SAS, Toulouse (FR)

(72) Inventor: Sébastien Haudrechy, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 666 days.

(21) Appl. No.: 16/527,993

(22) Filed: Jul. 31, 2019

(65) Prior Publication Data
US 2020/0071002 A1  Mar. 5, 2020

(30) Foreign Application Priority Data

Sep. 5, 2018 (FR) ...................................... 1857979

(51) Int. Cl.
*B64C 1/20* (2006.01)
*B64F 5/10* (2017.01)
*B64C 1/06* (2006.01)

(52) U.S. Cl.
CPC ................ *B64F 5/10* (2017.01); *B64C 1/061* (2013.01); *B64C 1/20* (2013.01)

(58) Field of Classification Search
CPC .... B64C 1/20; B64C 1/22; B64D 9/00; B64D 9/003
See application file for complete search history.

(56) References Cited

U.S. PATENT DOCUMENTS

| 3,419,164 A | * | 12/1968 | O'Neill | B64F 1/31 280/424 |
| 4,153,225 A | | 5/1979 | Paulsen | |
| 7,284,727 B2 | * | 10/2007 | Nolan | B64D 1/16 244/137.1 |

(Continued)

FOREIGN PATENT DOCUMENTS

| FR | 2919273 A1 | 1/2009 |
| WO | 2005100155 A2 | 10/2005 |
| WO | 2013041812 A1 | 3/2013 |

OTHER PUBLICATIONS

French Search Report; priority document.

*Primary Examiner* — Timothy D Collins
*Assistant Examiner* — Justin Michael Heston
(74) *Attorney, Agent, or Firm* — Greer, Burns & Crain, Ltd.

(57) ABSTRACT

A method for integrating and fitting at least one item of equipment and/or at least one line in a technical bay of an aircraft, comprising the steps comprising attaching the equipment and/or the line(s) on an integration module outside the fuselage of the aircraft, introducing the integration module into the fuselage of the aircraft via an opening of a baggage hold, and securing the integration module to a structure of the aircraft. An integration module is provided which comprises a chassis bounding a volume in which are positioned and attached at least one item of equipment and/or at least one line and having a cross section that is approximately identical to that of a baggage container and a length which is less than or equal to that of a baggage container.

6 Claims, 3 Drawing Sheets

(56) References Cited

U.S. PATENT DOCUMENTS

| | | | |
|---|---|---|---|
| 2002/0074456 A1* | 6/2002 | Marrero | B64F 1/324 244/137.1 |
| 2005/0247824 A1 | 11/2005 | Allison, Sr. | |
| 2010/0187064 A1 | 7/2010 | Safir | |
| 2014/0367220 A1* | 12/2014 | Lange | B64D 11/04 198/347.2 |

* cited by examiner

METHOD FOR INTEGRATING EQUIPMENT IN A TECHNICAL BAY OF AN AIRCRAFT USING AN INTEGRATION MODULE, AND AIRCRAFT COMPRISING AT LEAST ONE INTEGRATION MODULE

CROSS-REFERENCES TO RELATED APPLICATIONS

This application claims the benefit of the French patent application No. 1857979 filed on Sep. 5, 2018, the entire disclosures of which are incorporated herein by way of reference.

FIELD OF THE INVENTION

The present application relates to a method for integrating equipment in a technical bay of an aircraft using an integration module, and to an aircraft comprising at least one integration module.

BACKGROUND OF THE INVENTION

According to one embodiment, an aircraft fuselage comprises a skin affixed to a primary structure comprising transverse reinforcements, called frames, which are positioned approximately in transverse planes, and longitudinal reinforcements, called stringers, which are positioned approximately in longitudinal planes. The fuselage also comprises a horizontal upper floor which divides the interior of the fuselage into an upper zone in which are provided, for example, a cockpit and a passenger cabin, and a lower zone in which are provided forward and rear baggage holds that are arranged forward and aft of a central wing box, and technical bays provided, in particular, at each end of the forward baggage hold.

During assembly of the aircraft, various equipment and lines (wiring harnesses and/or pipework) associated therewith are installed successively in the technical bays. In general, the lines are connected directly to the primary structure of the fuselage.

The operations of integrating and attaching these various items of equipment and the associated lines on the production line increase the time required for assembling the aircraft. Moreover, given how tightly packed the equipment and associated lines are, the operations of integrating and attaching these to one another prove difficult owing to a lack of accessibility and problems of ergonomics.

BACKGROUND OF THE INVENTION

The present invention seeks to remedy some or all of the drawbacks of the prior art.

To that end, the invention relates to a method for integrating and fitting at least one item of equipment and/or at least one line in a technical bay positioned in a fuselage of an aircraft, the fuselage comprising at least one baggage hold adjacent to the technical bay and at least one opening dimensioned so as to permit, in operation, the insertion of baggage containers into the baggage hold, characterized in that the method comprises the steps comprising:

attaching the equipment and/or the line(s) on an integration module outside the fuselage of the aircraft, the integration module comprising a chassis bounding a volume in which are positioned the equipment and/or the line(s) and having a cross section that is approximately identical to that of a baggage container and a length which is less than or equal to that of a baggage container, introducing, via the opening, the integration module equipped with the equipment and/or the line(s) into the fuselage, in the baggage hold adjacent to the technical bay, moving the integration module in translation in a displacement direction from the baggage hold to the technical bay until it is in the fitted position, and securing the integration module to a structure of the aircraft.

The method of the invention makes it possible to reduce the time required for assembling the aircraft since the equipment and/or the line(s) are attached to the integration module outside the fuselage, in concurrent operation time, and are integrated into the technical bay in a single operation.

Since the operations of attaching the equipment and/or the line(s) are carried out outside the fuselage, the operators can move all around the integration module to carry out these attachment operations, which improves accessibility and ergonomics.

The invention also relates to an integration module which is characterized in that it comprises:

a chassis bounding a volume in which are positioned at least one item of equipment and/or at least one line and having a cross section that is approximately identical to that of a baggage container and a length which is less than or equal to that of the baggage container such that the baggage container can move in a baggage hold in a displacement direction, the chassis forming a self-supporting structure such that it can be moved when equipped with the equipment and/or the line(s), and at least one attachment system connecting the equipment and/or the line(s) to the chassis.

According to one configuration, the chassis is a welded fabricated structure comprising crosspieces, longerons, vertical uprights and inclined uprights positioned at the edges of a volume shape representing a baggage container.

According to another feature, the chassis comprises a first frame, positioned in a first plane, and a second frame, positioned in a second plane, the first and second planes being parallel to the displacement direction and separated so as to delimit, between them, a corridor allowing access to two zones, on either side of the first planes, in which are positioned the equipment and/or the line(s) secured to the chassis.

According to one configuration, the chassis comprises at least one first lower crosspiece having a central segment arranged in a same horizontal plane as a second lower crosspiece, and two end segments that are slightly offset upwards relative to the central segment.

According to one embodiment, the first and second planes are positioned at the ends of the central segment.

The invention also relates to an aircraft comprising at least one integration module positioned in a technical bay of the aircraft, each integration module being connected to a primary structure of the fuselage by at least one connecting system that is configured to immobilize, in a fitted position, the integration module with respect to the primary structure.

According to another feature, the connecting system comprises:

multiple lugs that are secured to the chassis, are mutually parallel and are oriented in the displacement direction of the integration module, feet, one for each lug, secured to the primary structure of the aircraft, which feet comprise orifices whose diameter is identical to that of the lugs, the feet being positioned such that the lugs are inserted into the orifices when the integration module is in the fitted position, a connection serving to immobilize the integration module in the displacement direction when it is in the fitted position.

According to one embodiment, the integration module comprises at least one first lower crosspiece having a central segment arranged in a same horizontal plane as a second lower crosspiece, and two end segments that are slightly offset upwards relative to the central segment. Moreover, the connecting system comprises first lugs that are secured to the first lower crosspiece and are positioned at the central segment, and second lugs that are secured to the second lower crosspiece and are offset with respect to the first lugs and are positioned facing the end segments such that the feet provided for the second lugs pass under the end segments when the integration module is moved up to the fitted position.

According to one configuration, the integration module supports at least one first segment of a line connected to a second segment of the line, the first and second segments being parallel to the displacement direction and positioned so as to be aligned when the integration module is in the fitted position, at least one of the first and second segments of the line comprising a connection system configured to connect, automatically and autonomously, the first and second segments of the line to one another when the integration module is moved in the displacement direction up to the fitted position.

BRIEF DESCRIPTION OF THE DRAWINGS

Other features and advantages will emerge from the following description of the invention, which description is given solely by way of example, with reference to the appended drawings in which.

DETAILED DESCRIPTION OF THE PREFERRED EMBODIMENTS

Figure 1:
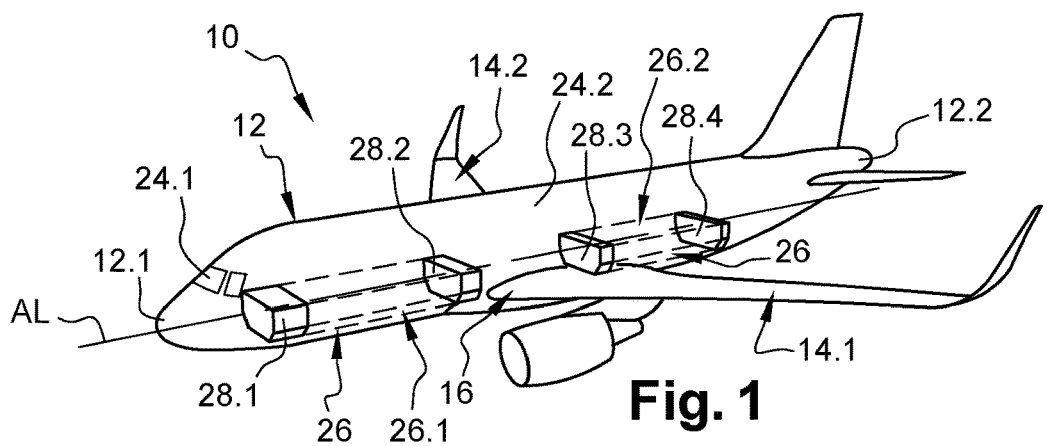
FIG. 1 is a perspective view of an aircraft, illustrating an embodiment.
Figure 2:
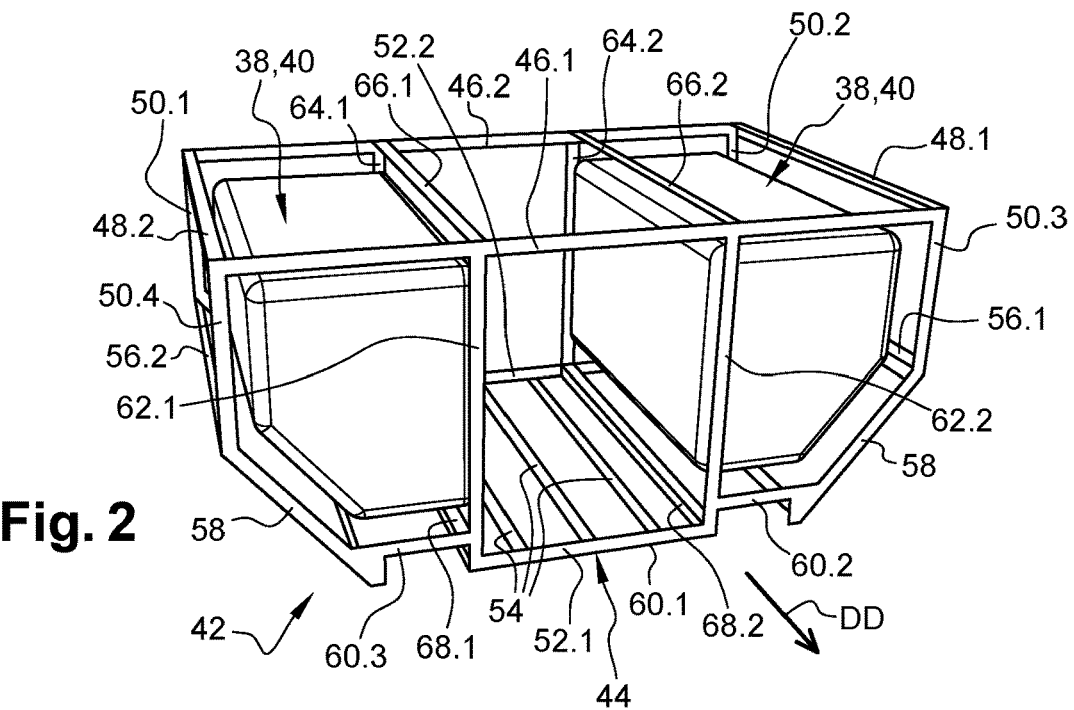
FIG. 2 is a perspective view of an integration module, illustrating an embodiment of the invention.

According to an embodiment shown in FIG. 1, an aircraft 10 comprises a fuselage 12 and wings 14.1 and 14.2 arranged on either side of the fuselage 12 and connected to the fuselage 12 at a central wing box 16.

The fuselage 12 extends from a nose 12.1 to a tail 12.2 along a longitudinal axis AL. For the remainder of the description, a radial direction is perpendicular to the longitudinal axis AL, a transverse plane is perpendicular to the longitudinal axis AL and a longitudinal plane contains the longitudinal axis AL.

Figure 4:
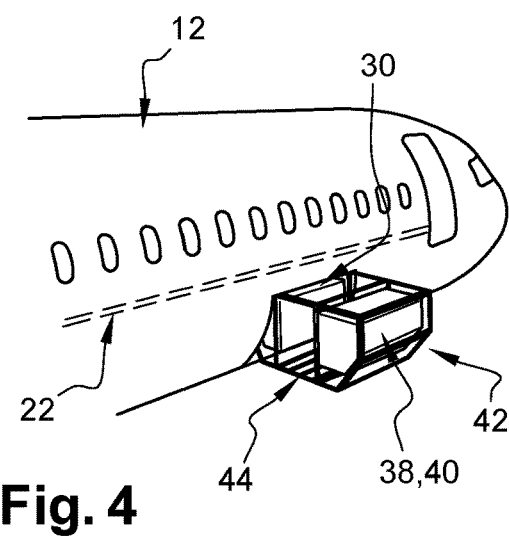
FIG. 4 is a perspective view of a part of the fuselage of an aircraft on a production line during insertion of an integration module equipped with the equipment and the associated lines.

The fuselage 12 comprises a skin 20 affixed to a primary structure 18 (shown in FIG. 6) comprising transverse reinforcements 18.1, called frames, which are positioned approximately in transverse planes, and longitudinal reinforcements 18.2, called stringers, which are positioned approximately in longitudinal planes. The fuselage 12 also comprises a horizontal upper floor 22 which divides the interior of the fuselage 12 into an upper zone in which are provided, for example, a cockpit 24.1 and a passenger cabin 24.2, and a lower zone 26 in which are provided forward and rear baggage holds 26.1, 26.2 that are arranged forward and aft of the central wing box 16, and technical bays 28.1 to 28.4 provided at at least one of the ends of one of the forward and rear baggage holds 26.1, 26.2. FIG. 1 shows technical bays 28.1 to 28.4 provided at each of the ends of the forward and rear baggage holds 26.1, 26.2. The fuselage 12 comprises, for each forward and rear baggage hold 26.1, 26.2, an opening 30 (shown in FIG. 4) that is dimensioned so as to allow the baggage containers to be inserted in operation. To give a sense of scale, the opening has a first dimension, considered parallel to the longitudinal direction, of the order of 1.60 m, and a second dimension, considered in a vertical direction, of between 1.10 m and 1.70 m.

Figure 5:
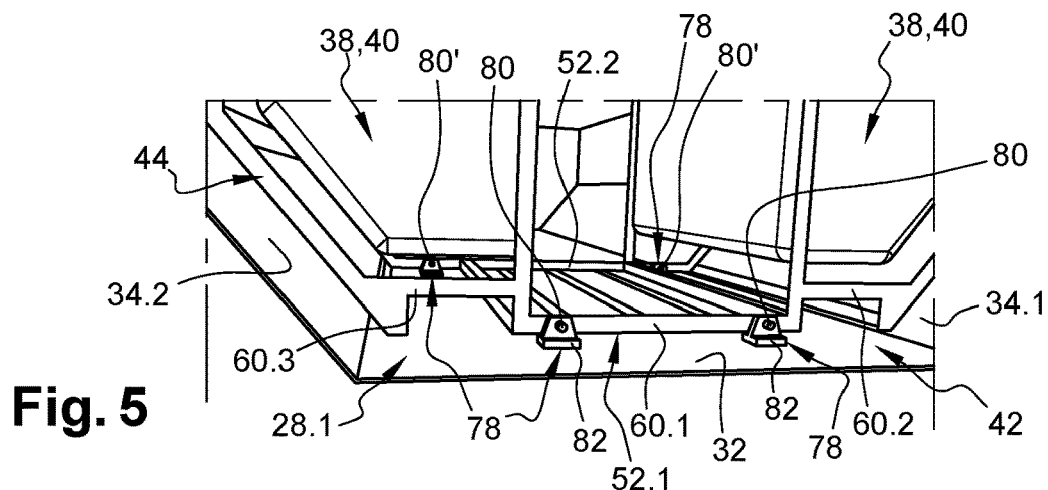
FIG. 5 is a perspective view of the lower part of an integration module connected to a structure of the aircraft.

According to one embodiment, shown in FIG. 5, the lower zone 26 of the fuselage 12 comprises a lower floor 32 on which the baggage containers can move in operation, and lateral walls 34.1, 34.2, arranged on either side of the lower floor 32, which are configured so as to immobilize the baggage containers in a direction that is horizontal and perpendicular to the longitudinal direction. According to one configuration, each lateral wall comprises an inclined lower part and an essentially vertical upper part.

According to one embodiment, the baggage holds 26.1, 26.2 and the technical bays 28.1 to 28.4 have the same cross section, which is very slightly greater than the cross section of a baggage container.

According to another embodiment, the technical bays 28.1 to 28.4 comprise only a lower floor arranged at the same height as the lower floor of the adjacent baggage hold 26.1 or 26.2, or at least one guiding system 36, for example two rails, arranged at the same height as the lower floor of the adjacent baggage hold 26.1 or 26.2 so as to allow an element to slide on the lower floor 32 of the adjacent baggage hold and then on the guiding system 36 of the technical bay 28.1 to 28.4.

Whatever the embodiment, at least one technical bay 28.1 to 28.4 of the aircraft is adjacent to a baggage hold 26.1, 26.2 and comprises at least one guiding system 36 which extends over at least part of the length of the technical bay (the dimension considered in the longitudinal direction), this guiding system being configured to allow an element to slide on the lower floor 32 of the adjacent baggage hold, then on the guiding system 36 of the technical bay 28.1 to 28.4, the technical bay 28.1 to 28.4 having a cross section that is equal to or greater than that of the adjacent baggage hold 26.1, 26.2.

Once assembled, the aircraft comprises, in each one of the technical bays 28.1 to 28.4, at least one item of equipment 38 which is generally associated with at least one line 40, such as a wiring harness or a pipe.

According to one feature of the invention, the aircraft 10 comprises at least one integration module 42 that is configured to be positioned in a technical bay 28.1 to 28.4 of the aircraft, and connected directly or indirectly to the primary structure 18, the integration module 42 being configured to support at least one item of equipment 38 and/or at least one line 40, which are secured to the integration module 42. Each integration module 42 is configured so as to be able to enter the fuselage 12 via an opening 30 provided in the fuselage and serving for the introduction of the baggage containers into the baggage holds 26.1, 26.2.

The integration module 42 comprises a chassis 44 having a cross section that is approximately identical to that of a baggage container and a length (dimension considered in the longitudinal direction when the chassis 44 is positioned in the fuselage 12) which is less than or equal to that of a baggage container, so as to be able to be introduced into the fuselage via the opening 30 and then moved in a displacement direction DD as far as the technical bay 28.1 to 28.4 via one of the baggage holds 26.1, 26.2. The length of the chassis 44 is determined depending on the volume taken up by the equipment 38 and/or line(s) 40 to be secured to the chassis 44. The dimensions of the integration module 42 can be adapted to the configuration and to the requirements of each aircraft 10.

According to one embodiment, the chassis 44 comprises forward and rear upper crosspieces 46.1, 46.2 (parallel to one another), left and right upper longerons 48.1, 48.2 (parallel to one another and perpendicular to the forward and rear upper crosspieces 46.1, 46.2) that connect the ends of the forward and rear upper crosspieces 46.1, 46.2, four vertical uprights 50.1 to 50.4 that are provided at each end of the forward and rear upper crosspieces 46.1, 46.2, forward and rear lower crosspieces 52.1, 52.2 respectively positioned vertically below the forward and rear upper crosspieces 46.1, 46.2, lower longerons 54 (parallel to one another and to the left and right upper longerons 48.1, 48.2) connecting the forward and rear lower crosspieces 52.1, 52.2, left and right intermediate longerons 56.1, 56.2 connecting the vertical uprights 50.1 to 50.4 in pairs and arranged vertically below the left and right upper longerons 48.1, 48.2, and four inclined uprights 58 connecting the vertical uprights 50.1 to 50.4 to the forward and rear lower crosspieces 52.1, 52.2. Thus, the chassis 44 is a welded fabricated structure comprising crosspieces 46.1, 46.2, 52.1, 52.2, longerons 48.1, 48.2, 54, vertical uprights 50.1 to 50.4 and inclined uprights 58 positioned at the edges of a volume shape representing a baggage container.

According to one configuration, at least one of the forward or rear lower crosspieces 52.1, 52.2 comprises multiple segments 60.1, 60.2, 60.3, a central segment 60.1 arranged in a same horizontal plane as the other lower crosspiece, and two end segments 60.2, 60.3 that are slightly offset upwards relative to the central segment 60.1. Thus, when the chassis 44 slides on a lower floor 32, elements that stand proud of the lower floor 32 can pass below the end segments 60.2, 60.3.

According to one configuration, the chassis 44 comprises left and right forward vertical reinforcements 62.1, 62.2 connecting the upper and lower forward crosspieces 46.1, 52.1, left and right rear vertical reinforcements 64.1, 64.2 connecting the upper and lower rear crosspieces 46.2, 52.2, left and right upper horizontal reinforcements 66.1, 66.2 connecting the forward and rear upper crosspieces 46.1, 46.2 and left and right lower horizontal reinforcements 68.1, 68.2 connecting the forward and rear lower crosspieces 52.1, 52.2. The forward and rear right-hand vertical reinforcements 62.1, 64.1 and the upper and lower right-hand horizontal reinforcements 66.1, 68.1 form a first frame positioned in a first plane P1 that is essentially vertical and parallel to the left and right upper longerons 48.1, 48.2. The forward and rear left-hand vertical reinforcements 62.2, 64.2 and the upper and lower left-hand horizontal reinforcements 66.2, 68.2 form a second frame positioned in a second plane P2 that is essentially vertical and parallel to the left and right upper longerons 48.1, 48.2.

Figure 3:
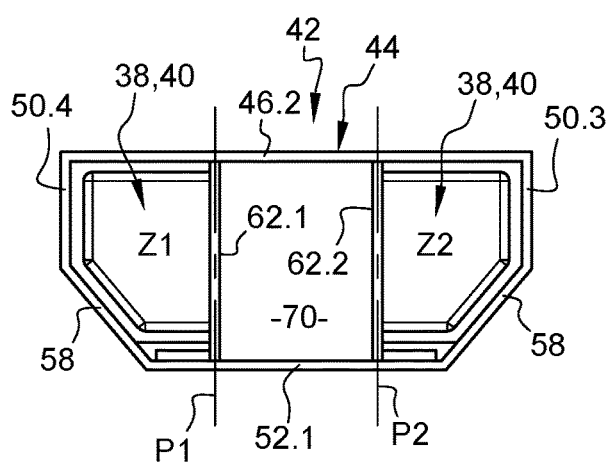
FIG. 3 is a front view of the integration module shown in FIG. 2.

As shown in FIG. 3, the first and second planes P1 and P2 are parallel to the displacement direction DD and separated so as to delimit, between them, a corridor 70 allowing access to two zones Z1, Z2, on either side of the first planes P1, P2, in which are positioned the equipment 38 and/or the line(s) 40 secured to the chassis 44.

According to one configuration, the first and second planes P1, P2 are provided at the ends of the central segment 60.1 of one of the forward or rear lower crosspieces 52.1, 52.2. The chassis 44 comprises multiple lower longerons 54 between the first and second planes P1, P2, so as to form or support a floor.

Of course, the invention is not restricted to this embodiment for the integration module 42, the latter comprising a chassis 44 that takes the form of a welded fabricated structure that bounds a volume in which are positioned the equipment 38 and/or the line(s) 40 to be secured to the chassis 44, and which has a cross section that is approximately identical to that of a baggage container and a length that is less than or equal to that of a baggage container. Whatever the embodiment, the integration module comprises a chassis 44 forming a self-supporting structure by means of which it can be moved with its equipment and/or lines.

Figure 8:
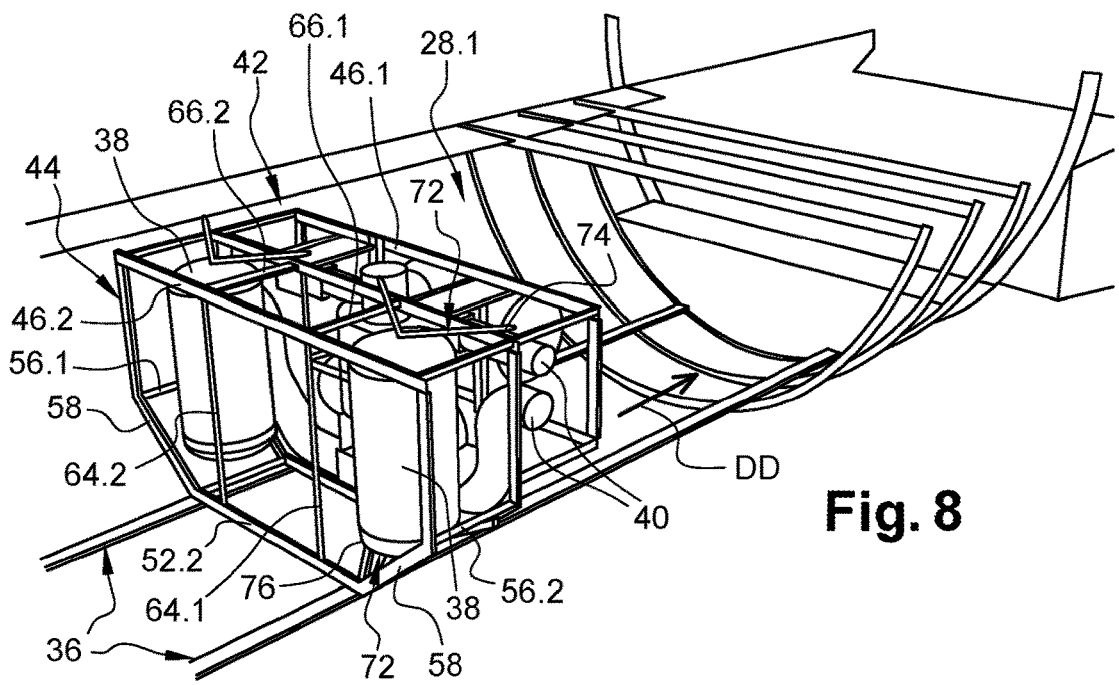
FIG. 8 is a perspective view of an integration module equipped with the equipment and the associated lines, illustrating an embodiment of the invention.

By way of example, FIG. 8 shows equipment 38 and pipework 40 of an air-treatment and -conditioning system supported by the chassis 44. Of course, the invention is not restricted to this type of equipment or lines.

The integration module 42 comprises at least one attachment system 72 connecting the equipment 38 and/or the line(s) 40 to the chassis 44. These attachment systems 72 may comprise reinforcements 74 or arrangements 76 of the chassis 44, depending on the equipment 38 or the line 40 that is to be supported by the chassis 44 and is to be connected to the latter. Whatever the embodiment of the attachment systems 72, all of the equipment 38 and the lines 40 are not connected directly to the structure of the aircraft but via the intermediary of the integration module 42.

A single technical bay 28.1 to 28.4 may comprise one or more integration modules 42.

Each integration module 42 is connected to the primary structure 18 of the fuselage by at least one connecting system 78 that is configured to immobilize, in a fitted position, the integration module 42 with respect to the primary structure 18.

Figure 7A:
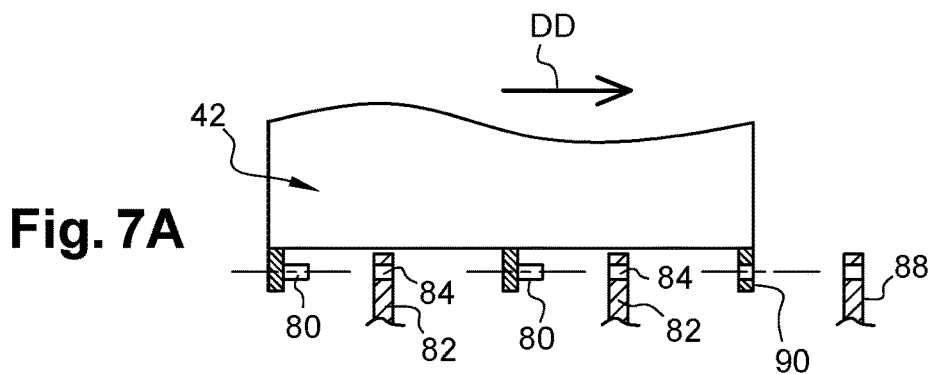
FIG. 7A is a lateral schematic representation of the lower part of an integration module prior to its attachment to a structure of the aircraft.
Figure 7B:
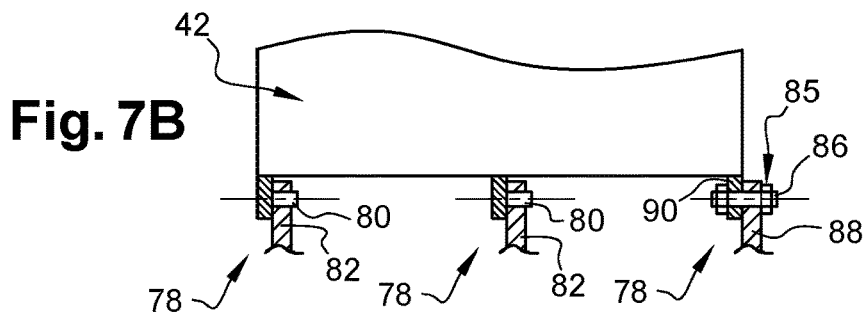
FIG. 7B is a lateral schematic representation of the lower part of an integration module after fitting.

According to one embodiment, illustrated by FIGS. 5, 7A and 7B, the connecting system 78 comprises multiple lugs 80 that are secured to the chassis 44, are mutually parallel and are oriented in the displacement direction DD of the integration module 42 (parallel to the left and right upper longerons 48.1, 48.2). The lugs are positioned in the lower part of the chassis 44, in particular at the forward and rear lower crosspieces 52.1, 52.2. In addition, the connecting system 78 comprises feet 82, one for each lug 80, secured to the primary structure 18 of the aircraft, in particular to the lower floor 32, which feet comprise orifices 84 whose diameter is identical to that of the lugs 80, the feet 82 being positioned such that the lugs 80 are inserted into the orifices 84 when the integration module 42 is in the fitted position. When the lugs 80 are inserted into the orifices 84 of the feet 82, the integration module 42 is immobilized in a transverse plane and may move in the longitudinal direction.

According to a configuration shown in FIG. 5, the first lugs 80, secured to the forward lower crosspiece 52.1, are positioned at the central segment 60.1, and the second lugs 80', that are secured to the rear lower crosspiece 52.2, are offset with respect to the first lugs 80 and are positioned facing the end segments 60.2, 60.3 such that the feet 82, which are secured to the lower floor 32 and which are provided for the second lugs 80', pass under the end segments 60.2, 60.3 when the integration module 42 is moved up to the fitted position.

As shown in FIG. 7B, the connecting system 78 also comprises a connection 85 serving to immobilize the integration module in the displacement direction DD when it is in the fitted position. By way of example, this connection 85 is a bolt 86 connecting a first plate 88 secured to the primary structure 18 and a second plate 90 secured to the integration module 42.

Of course, the invention is not restricted to these embodiments for connecting the integration module 42 to the primary structure 18 and immobilizing it with respect to the latter.

Figure 6:
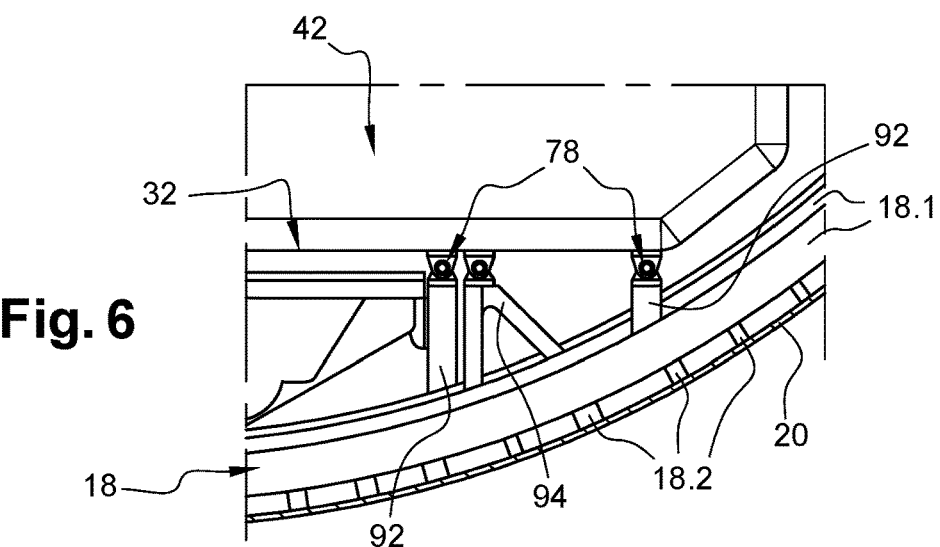
FIG. 6 is a front view of the lower part of an integration module connected to the primary structure of an aircraft, illustrating an embodiment of the invention.

According to an embodiment in FIG. 6, an integration module 42 is connected to the primary structure 18 via the intermediary of at least one rod 92 and/or at least one clevis 94 assigned to this connection. As a variant, it is possible to use rods and/or clevises performing other roles, such as reinforcing the upper floor 22.

Figure 9:
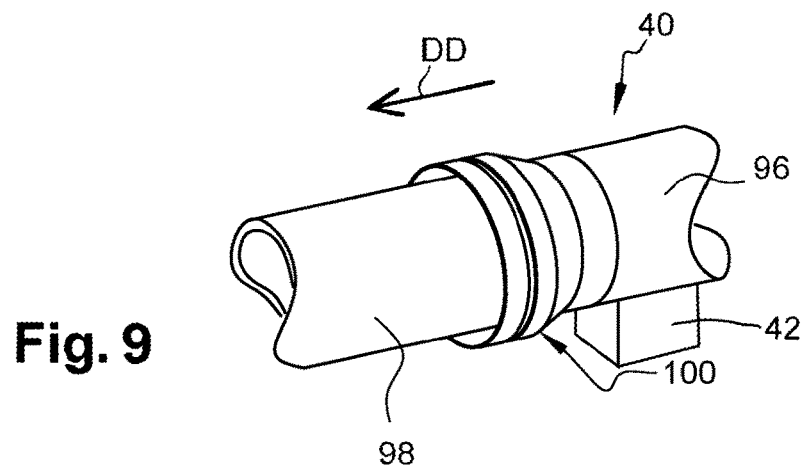
FIG. 9 is a perspective view of two connected segments of a pipe.

When the integration module 42 supports a first segment 96 of a pipe connected in operation to a second segment 98 of the same pipe, as shown in FIG. 9. The first and second segments 96, 98 are equipped with a connection system 100 that is configured to automatically and autonomously connect the first and second segments 96, 98 when the integration module 42 is moved in the displacement direction DD up to the fitted position.

Figure 10:
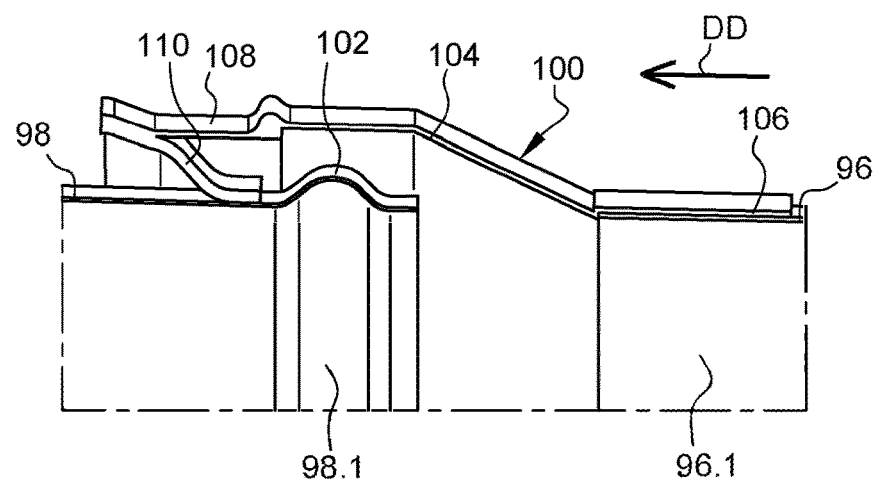
FIG. 10 is a longitudinal section through the two pipe segments shown in FIG. 9, illustrating an embodiment of a connection system.

According to an embodiment illustrated by FIG. 10, this connection system 100 comprises a peripheral bulge 102 on the second segment 98, projecting outwards from the second segment 98, located at the end 98.1 of the second segment 98. In addition, the connection system 100 comprises a sleeve 104, secured to the first segment 96 by means of a sealing connection 106 positioned at the end 96.1 of the first segment 96, which has a widened mouth 108 which permits insertion of the end 98.1 of the second segment 98 and a deformable collar 110 secured to the sleeve 104.

This collar 110 is configured to provide a seal between the sleeve 104 and the second segment 98. It has a conical shape allowing the introduction of the end 98.1 of the second segment 98 and its peripheral bulge 102 into the mouth 108, and preventing withdrawal of the end 98.1 of the second segment 98.

Of course, the invention is not restricted to this embodiment for the connection system 100. Whatever the embodiment, when at least a first segment of a line 40 supported by the integration module 42 is to be connected to a second segment of the line 40, the first and second segments are parallel to the displacement direction DD and positioned so as to be aligned when the integration module 42 is in the fitted position. At least one of the first and second segments of the line 40 comprises a connection system 100 that is configured to automatically and autonomously connect the first and second segments of the line 40 to one another when the integration module 42 is moved in the displacement direction DD up to the fitted position.

The method for integrating and fitting at least one item of equipment 38 and/or at least one line 40 in a technical bay 28.1 to 28.4 of an aircraft 10 comprises the steps comprising:

attaching the equipment 38 and/or the line(s) 40 on an integration module 42 outside the fuselage 12 of the aircraft, introducing, via an opening 30, the integration module 42 equipped with the equipment 38 and/or the line(s) 40 into the fuselage 12, in a baggage hold 26.1, 26.2 adjacent to the technical bay 28.1 to 28.4, moving the integration module 42 in translation in the displacement direction DD from the baggage hold 26.1, 26.2 to the technical bay 28.1 to 28.4 until it is in the fitted position, and finally securing the integration module 42 to the primary structure 18 of the aircraft.

Attaching the equipment 38 and/or the line(s) 40 to the integration module 42 outside the fuselage 12 and integrating them in the technical bay 28.1 to 28.4 at the same time makes it possible to reduce the time required for assembling the aircraft since the step of attaching the equipment 38 and/or the line(s) 40 can be carried out in concurrent operation time.

Since the operations of attaching the equipment 38 and/or the line(s) 40 are carried out outside the fuselage 12, the operators can move all around the integration module 42 to carry out these attachment operations, which improves accessibility and ergonomics.

For a given family of aircraft, the chassis 44 of the integration modules 42 can all be identical and attached to the primary structure 18 in the same way. Thus, whatever the equipment and/or lines, the operator(s) use the same tools within the fuselage to attach the various integration modules 42.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An integration module for implementing a method for integrating and fitting at least one of at least one item of equipment or at least one line in a technical bay of a fuselage of an aircraft, wherein the integration module comprises:
   a chassis bounding a volume in which are positioned at least one of at least one item of equipment or at least one line and having a cross section that is approximately identical to that of a baggage container and a length which is less than or equal to that of a baggage container such that the baggage container can move in a baggage hold in a displacement direction, the chassis forming a self-supporting structure such that the chassis can be moved when equipped with at least one of the equipment or the at least one line, and at least one attachment system connecting at least one of the equipment or the at least one line to the chassis, wherein the chassis is a welded fabricated structure comprising crosspieces, longerons, vertical uprights and inclined uprights positioned at edges of a volume shape representing a baggage container, wherein the integration module is connected to a primary structure of the fuselage by at least one connecting system that is configured to immobilize, in a fitted position, the integration module with respect to the primary structure, wherein the integration module supports at least one first segment of a line connected to a second segment of the line, the at least one first segment and the second segment being parallel to the displacement direction and positioned so as to be aligned when the integration module is in the fitted position, at least one of the at least one first and second segments of the line comprising a connection system configured to connect, automatically and autonomously, the at least one first and second segments of the line to one another when the integration module is moved in the displacement direction up to the fitted position, wherein the chassis comprises a first frame, positioned in a first plane, and a second frame, positioned in a second plane, the first and second planes being parallel to the displacement direction and separated so as to delimit, between them, a corridor allowing access to two zones on either side of the first planes, in which are positioned at least one of the equipment or the at least one line secured to the chassis.

2. The integration module according to claim 1, wherein the chassis comprises at least one first lower crosspiece having a central segment arranged in a same horizontal plane as a second lower crosspiece, and two end segments that are slightly offset upwards relative to the central segment.

3. The integration module according to claim 1, wherein the chassis comprises at least one first lower crosspiece having a central segment arranged in a same horizontal plane as a second lower crosspiece, and two end segments that are slightly offset upwards relative to the central segment, and wherein the first and second planes are positioned at opposite ends of the central segment.

4. An aircraft comprising:

at least one integration module positioned in the technical bay of the aircraft, the at least one integration module comprising:

a chassis bounding a volume in which are positioned at least one of at least one item of equipment or at least one line and having a cross section that is approximately identical to that of baggage container and a length which is less than or equal to that of a baggage container such that the baggage container can move in a baggage hold in a displacement direction, the chassis forming a self-supporting structure such that the chassis can be moved when equipped with at least one of the equipment or the at least one line, and at least one attachment system connecting at least one of the equipment or the at least one line to the chassis, wherein the chassis is a welded fabricated structure comprising crosspieces, longerons, vertical uprights and inclined uprights positioned at edges of a volume shape representing a baggage container, wherein the integration module is connected to a primary structure of the fuselage by at least one connecting system that is configured to immobilize, in a fitted positioned, the integration module with respect to the primary structure, wherein the integration module supports at least one first segment of a line connected to a second segment of the line, the at least one first segment and the second segment being parallel to the displacement direction and positioned so as to be aligned when the integration module is in the fitted position, at least one of the at least one first and second segments of the line comprising a connection system configured to connect, automatically and autonomously, the at least one first and second segments of the line to one another when the integration module is moved in the displacement direction up to the fitted position, and wherein the connecting system comprises:

multiple lugs secured to the chassis that are mutually parallel and are oriented in the displacement direction of the integration module, feet, one for each lug, secured to the primary structure of the aircraft, which feet comprise orifices whose diameter is identical to that of the lugs, the feet being positioned such that the lugs are inserted into the orifices when the integration module is in the fitted position, a connection serving to immobilize the integration module in the displacement direction when the integration module is in the fitted position.

5. The aircraft according to claim 4, wherein the integration module comprises at least one first lower crosspiece having a central segment arranged in a same horizontal plane as a second lower crosspiece, and two end segments that are slightly offset upwards relative to the central segment, and wherein the connecting system comprises first lugs that are secured to the first lower crosspiece and are positioned at the central segment, and second lugs that are secured to the second lower crosspiece and are offset with respect to the first lugs and are positioned facing the end segments such that the feet provided for the second lugs pass under the end segments when the integration module is moved up to the fitted position.

6. An integration module for implementing a method for integrating and fitting at least one of at least one item of equipment or at least one line in a technical bay of a fuselage of an aircraft, wherein the integration module comprises:

a chassis bounding a volume in which are positioned at least one of at least one item of equipment or at least one line and having a cross section that is approximately identical to that of a baggage container and a length which is less than or equal to that of a baggage container such that the baggage container can move in a baggage hold in a displacement direction, the chassis forming a self-supporting structure such that the chassis can be moved when equipped with at least one of the equipment or the at least one line, and at least one attachment system connecting at least one of the equipment or the at least one line to the chassis, wherein the chassis comprises a first frame, positioned in a first plane, and a second frame, positioned in a second plane, the first and second planes being parallel to the displacement direction and separated so as to delimit, between them, a corridor allowing access to two zones on either side of the first planes, in which are positioned at least one of the equipment or the at least one line secured to the chassis, wherein each integration module is connected to a primary structure of the fuselage by at least one connecting system that is configured to immobilize, in a fitted position, the integration module with respect to the primary structure, wherein the integration module supports at least one first segment of a line connected to a second segment of the line, the at least one first and second segments being parallel to the displacement direction and positioned so as to be aligned when the integration module is in the fitted position, at least one of the at least one first and second segments of the line comprising a connection system configured to connect, automatically and autonomously, the at least one first and second segments of the line to one another when the integration module is moved in the displacement direction up to the fitted position.

* * * * *